Patented Nov. 10, 1942

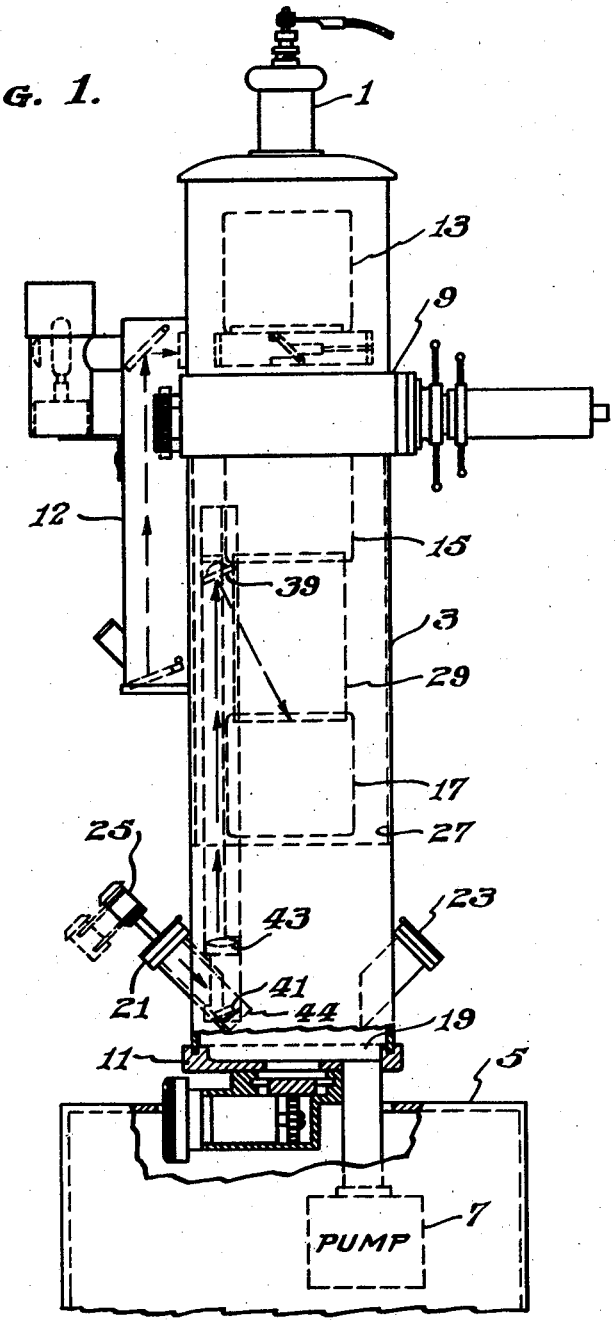

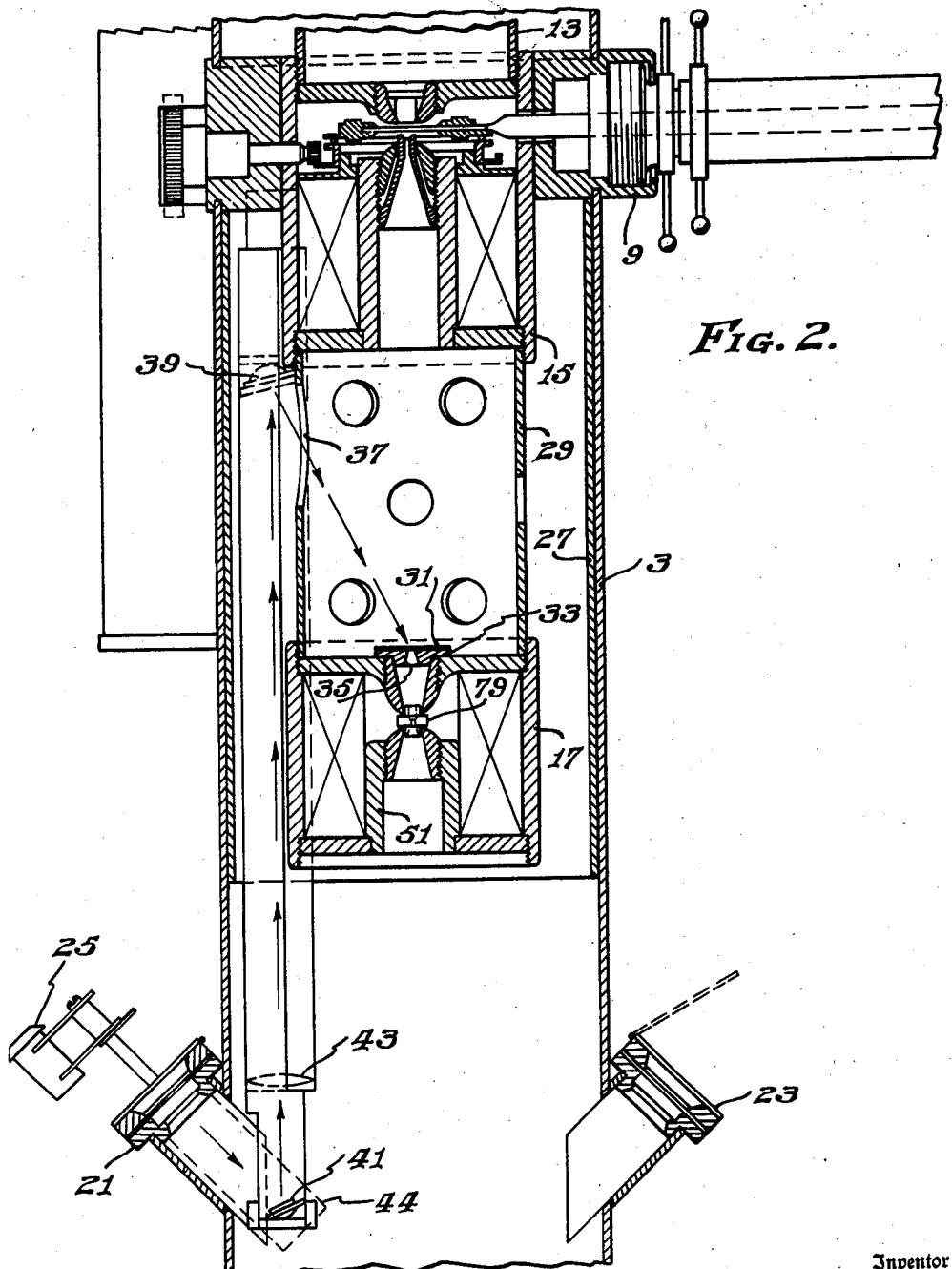

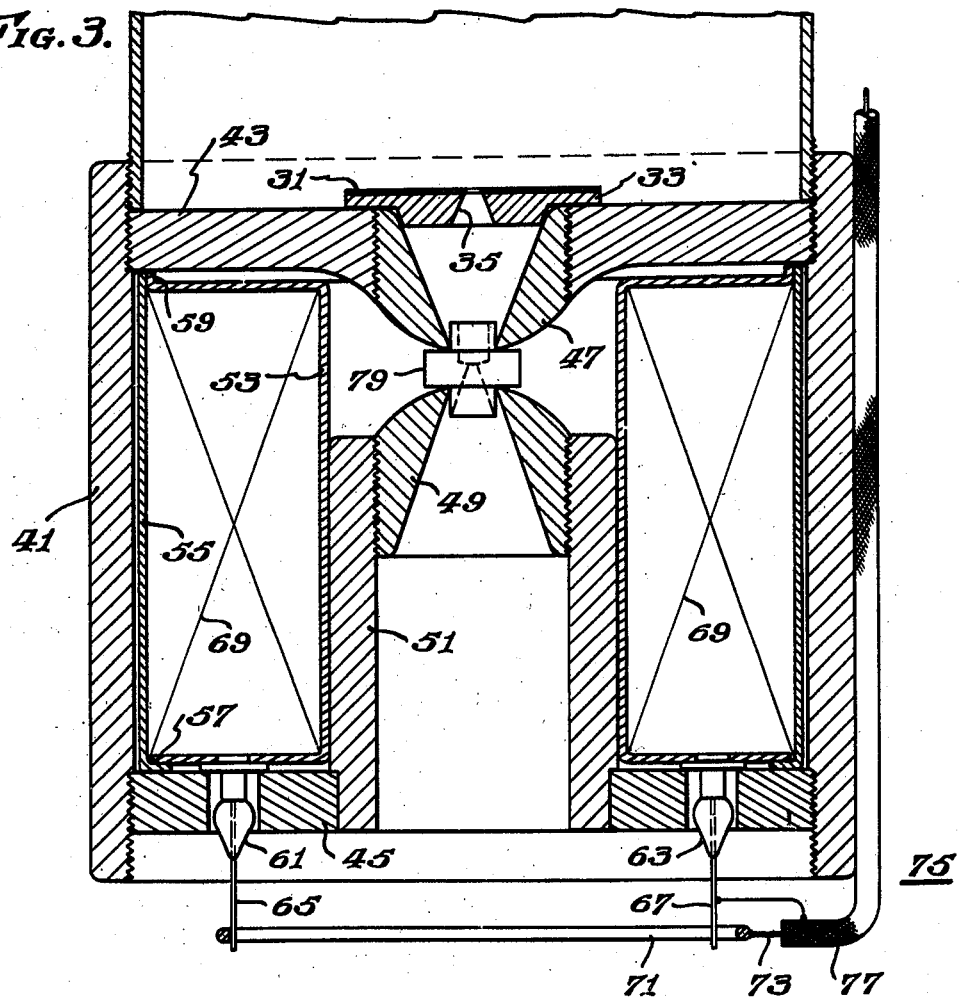

2,301,303

UNITED STATES PATENT OFFICE 2,301,303

SHIELDED ELECTRONIC MICROSCOPE

Ladislaus Marton, Collingswood, N. J., assignor to Radio Corporation of America, a corporation of Delaware Application February 17, 1940, Serial No. 319,375

4 Claims. (Cl. 250—49.5)

This invention relates to electronic microscopes and more especially to an electronic microscope which is shielded from the influences of ambient fields.

In electronic microscopes, focusing of the electron beam is effected by magnetic or electric lenses. Either or both types of lenses may be used provided the microscope is shielded from the earth's field and other stray fields which might cause lens distortion.

While different types of shielding have been employed, in some cases the shielding is fairly satisfactory provided no apertures are included. However, in the event that an intermediate electron image located within the shield is to be viewed, it is difficult to avoid interrupting the shielding. Even then it may be necessary to place the intermediate viewing device in a region which is not always convenient to the observer who is generally interested in the main electronic image.

Among the objects of the present invention is the provision of means in an electronic microscope for the production of an intermediate image which may be viewed from the position at which the main image is visible. Another object is to provide means in an electronic microscope for shielding the electron lenses. An additional object is to provide means whereby the magnetic lenses of an electron microscope may be included within the microscope shielding without impairing the microscope vacuum.

The invention will be described by referring to the accompanying drawings in which Figure 1 is an elevational view of one embodiment of the electronic microscope of the invention, Figure 2 is a sectional view of the intermediate image viewing means, and Figure 3 is a sectional view of a magnetic lens employed in the microscope. Similar reference numerals will be applied to similar elements in the several figures.

Referring to Fig. 1, an electron gun 1 is mounted on the top of a cylindrical envelope or support 3 which is positioned on a base 5. The base may include a vacuum pump 7 and a power source which is not shown. In the upper portion of the cylindrical support is included a suitable chamber 9 through which the object to be imaged is inserted within the microscope. The details of an object inserting device have been disclosed in application Serial No. 265,375, filed March 31, 1939 for "Device for inserting objects into a vacuum." A means for inserting photographic plates within the microscope is indicated at the base of the cylindrical support by the reference numeral 11. The details of this device are shown in U. S. Patent 2,200,095 which issued on May 7, 1940, on application Serial No. 258,887, filed February 28, 1939, for "Photographic device for vacuum apparatus." It should be understood that the present invention is not limited to the precise means which are shown in the reference applications which are given by way of example rather than limitation.

If desired, a light microscope 12 may be mounted on the cylindrical support in accordance with the disclosure in copending application Serial No. 305,432, filed November 21, 1939 for "Improvement in microscopes." It should be understood that the light microscope is not an essential element of the instant invention.

Within the cylindrical support are included three electronic lenses which are indicated by the broken line squares 13, 15, 17. These lenses will be hereinafter described in detail. A fluorescent screen 19 is inserted just above the photographic plate holder device 11. The screen is viewed through windows 21, 23 which are included in the lower part of the cylindrical support. The intermediate image is viewed through an eye piece 25 which is preferably pivotally mounted adjacent one of the windows 21 so that the main image and the intermediate image may be viewed from substantially the same position. This arrangement is of convenience to the observer.

Reference is now made to Fig. 2. A magnetic shield 27 is inserted within the cylindrical support or envelope 3. At the upper portion of the magnetic shield are arranged the first magnetic lens 13 and the specimen holder 9. The second magnetic lens is located just below the specimen holder 9. An apertured supporting cylinder 29 is mounted on the lower part of the second lens and is arranged to support the third lens 17. A fluorescent plate 31 is mounted on a supporting screen 33. The screen 33 and plate 31 include an aperture 35 through which the main image beam is projected.

It should be understood that the intermediate image is ordinarily not magnified more than about a hundredfold. However, it is often helpful to the observer to view the intermediate image in order that a particular portion thereof may be selected for the main image, or in some cases it is desirable to study the larger image. If the intermediate image were made directly visible to the observer, it would be necessary to include an aperture in the shielding. Such aperture would be undesirable for two reasons. First, it would come at a position not convenient to the observer using the main window 21, and, second, it would permit stray fields to influence the image forming beam. In the present arrangement, both of these defects have been overcome by including an aperture 37 in the supporting cylinder 29 and mounting a mirror 39 adjacent the upper portion of the aperture 37 and within the upper magnetic shield 27. This mirror 39 is viewed through the eye piece 25, a second mirror 41 and a lens 43. The second mirror and the lens are mounted below the magnetic screen 27 where the ambient fields have substantially no undesired influence on the image forming beam. As thus arranged, it is possible to view from a convenient point the intermediate image formed on the fluorescent screen 33 without sacrificing the shielding. The second window 23 is located so that two observers may simultaneously view the main image. Since the intermediate image is more brilliant than the main image and is visible in the second mirror 41 through the window 21, it is desirable to place a suitable shield 44 between the second mirror and the fluorescent screen 19 to prevent the stray light from the mirror or the supporting frame from interfering with an observer's concentration on the main image. It is understood that blacking, a diaphragm or like means may be used for the same purpose.

In locating the magnetic lenses within the microscope, it is desirable to isolate the coils of the magnet from the evacuated part of the chamber. Otherwise, the vacuum might be impaired by the gases liberated from the coils. One suitable embodiment of the magnetic lens system is shown in Fig. 3. The magnetic structure includes an outer cylinder 41 to which are attached an upper annulus 43 and a lower annulus 45. A cylindrical pole piece 47 is secured to the upper annulus. A second cylindrical pole piece 49 is suitably secured to an inner annular member 51 which is fastened to the lower annulus 45.

The coil structure is housed within an enclosure which may be made of copper. The enclosure preferably consists of an inner spool 53 upon which the magnetizing coil is wound. The spool 53 is enclosed by a cylinder 55 which is flanged at one end 57. The flanged end 57 is soldered to the spool 53. The upper end of the spool 53 includes a flange 59 which is soldered to the upper end of the surrounding cylinder 55. A pair of glass-metal inserts 61, 63 are soldered to the lower portion of the spool 53. The lead wires 65, 67 of the coils, which are indicated by the crossed lines 69, are connected through these glass-metal inserts in a manner which is known in the vacuum tube art. The glass-metal inserts 61, 63 pass through holes in the lower magnetic plate 45. In order to avoid any disturbing effects which might be caused by asymmetrical connecting leads, a symmetrical connection to the lead 65 is made by means of a loop 71 which is connected to the inner conductor 73 of a shielded line 75. The shielded portion 77 is connected to the remaining coil lead 67. It should be understood that the coil enclosure is made vacuum-tight and may be exhausted. The apertured element 79 included between the upper and lower pole pieces 47, 49 is used to restrict the cross-sectional area of the image forming beam.

Thus, the invention has been described as a shielded electronic microscope in which an intermediate electronic image may be viewed. The eye piece for the intermediate image is conveniently located near the window through which the main image is observed. The magnetic lenses are located within the evacuated portion of the microscope and within the shielding. The magnetic lenses include coils housed within enclosures which prevent impairment of the vacuum.

I claim as my invention:

1. An electronic microscope including an evacuated envelope, a magnetic electronic lens including a magnetic shell housed within said envelope, a vacuum tight enclosure for said magnetic lens, and means in addition to the magnetic structure of said lens for shielding the electrons passing through said lens from stray fields.

2. An electronic microscope including an evacuated envelope, a magnetic electronic lens including a magnetic shell housed within said envelope, a vacuum tight enclosure for said magnetic lens, and means within said evacuated envelope and in addition to the magnetic structure of said lens for shielding the electrons passing through said lens from stray fields.

3. An electron microscope comprising an evacuable envelope containing an open ended cylindrical shield, electron optical means including a fluorescent screen mounted within and in spaced relation with respect to said shield for forming an intermediate image of the object to be viewed, said screen having an aperture therein through which electrons pass to the exterior of said shield through an open end thereof, a second fluorescent screen mounted exterior of said shield in a position to intercept said electrons, a window in said envelope through which said second screen may be viewed, and an optical system including a lens element mounted in the space between said first fluorescent screen and said shield for transmitting said intermediate image through said open end of said shield to a point adjacent said window whereby said intermediate image and said second screen may be viewed simultaneously.

4. An electron microscope including, in combination, a shield for preventing fields of external origin from impairing the operation of said microscope, an electron optical system including a fluorescent screen mounted within said shield for forming a first image of the object to be viewed, a second electron optical system including an electron lens element mounted within said shield, and a second fluorescent screen mounted exterior of said shield for forming a second image comprising at least a portion of said object, a reflector mounted adjacent said second fluorescent screen exterior of said shield, and optical means mounted in image transfer relation with respect to said first fluorescent screen and said reflector for transmitting said first image to said reflector whereby said first and second images may be viewed simultaneously.

LADISLAUS MARTON.